Figure 1:
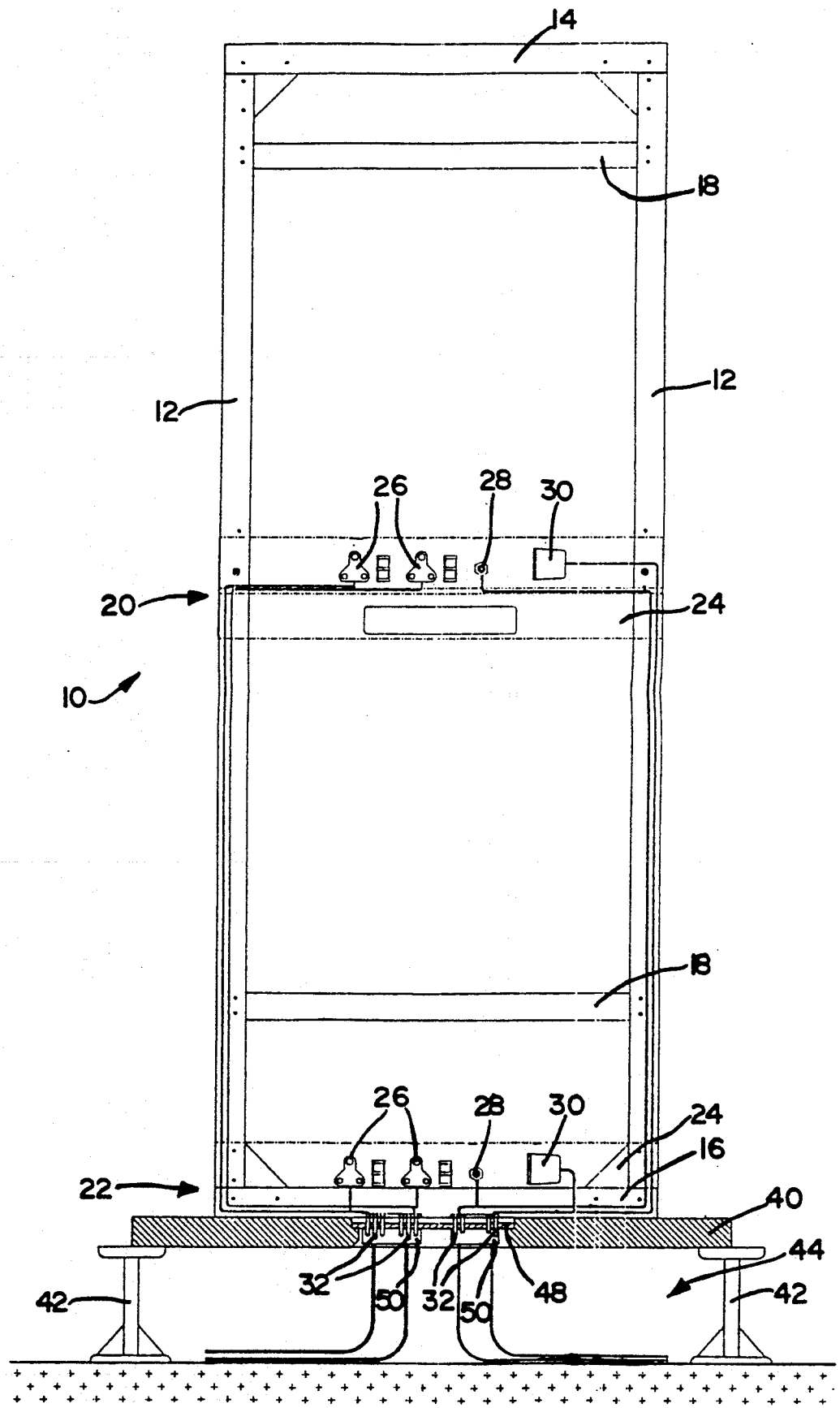

United States Patent [19]

Thompson

[11] Patent Number: 5,081,809
[45] Date of Patent: Jan. 21, 1992

[54] DEMOUNTABLE WALL PANELLING

[75] Inventor: Bryan H. Thompson, Kensington, South Africa

[73] Assignee: Environmental Panelling Systems (PTY) Ltd., South Africa

[21] Appl. No.: 617,785

[22] Filed: Nov. 26, 1990

[51] Int. Cl.$^5$ .............................................. E04B 2/00
[52] U.S. Cl. ........................................ 52/221; 174/48
[58] Field of Search ....................... 52/36, 221, 126.6; 174/48, 49

[56] References Cited

U.S. PATENT DOCUMENTS 4,104,710 8/1978 Damico et al. ...................... 174/48

Primary Examiner—David A. Scherbel
Assistant Examiner—Wynn Wood
Attorney, Agent, or Firm—Rockey and Rifkin

[57] ABSTRACT

A demountable wall panelling system comprises a plurality of framework sections that can be placed along a line along which panelling is required and be engaged with one another for forming a structure on to which cladding panels can be releasably engaged. One or more framework sections includes at least one set of power supply points mounted thereon, the power supply points being electrically connected to connector pins secured to the framework section. The connector pins are disposed so that upon placement of the framework section, the pins are received in complementary socket formations secured to the floor region beneath the framework section, providing contact with electric power supplies for supplying power to the power supply points.

16 Claims, 2 Drawing Sheets

DEMOUNTABLE WALL PANELLING

This invention relates to wall panelling. More particularly, the invention relates to a demountable wall panelling system and to electrical and communication wiring in conjunction with such a panelling system.

Demountable wall panelling is commonly used in combination with floor mounted power ducting for electrical and communication wires and with access flooring which provides a service cavity through which electrical and communication wires can pass to required locations where connector points are required. The said panelling usually comprises a framework structure made up of a series of individual framework sections that are positioned along a line where panelling is required, the framework sections making provision for cladding panels to be releasably engaged therewith. The present invention relates particularly to panelling and access flooring of the above general type, and to floor mounted power ducting, as is well known.

According to the invention there is provided a framework section for a demountable wall panelling system, which includes a plurality of framework elements forming the main structure of the framework section, at least one set of power supply points mounted on the said main structure and a set of connector formations electrically connected to the power supply points, the connector formations being positioned on the framework section in a location in which, upon location of the framework section, in its operative configuration, the connector formations are electrically connected to complementary formations provided within the floor region where the framework section is located.

The framework elements forming the main structure of the framework section may include two uprights, a top member and a base member, forming a rectangular structure with the top member and the base member holding the uprights in their required parallel spaced configuration. Also, the uprights may have at least one support rail secured between them, the support rail having formations for the releasable engagement of cladding panels on the framework section. The exact construction of the framework elements and framework section is greatly variable and as this does not form a specific part of the present invention, this is not defined in any further detail herein.

The set of power supply points may be mounted on a support panel that is mounted on the main structure in a predetermined required location. As such, the support panel may be mounted in the operative bottom skirting region of the main structure or, alternatively, may be mounted on the framework section in an intermediate region between the operative top and bottom ends thereof. For the latter configuration, the support panel may be disposed immediately above desking that may be associated with the panelling.

Further according to the invention, the set of power supply points may include a set of socket formations together with associated switches and other electrical components which will facilitate the use of the supply points for predetermined power supply applications. Typically, the power supply points can provide for power supply to electrical and electronic equipment, telephone and other communication equipment, and/or the like, in the operative configuration of the framework section.

The framework section of the invention also may include two sets of equivalent power supply points that are interconnected and that are connected to the same connector formations, the sets of power supply points being mounted at different locations on the main structure, typically in the locations as proposed above for the individual sets of power supply points.

For the configuration of the invention in which the framework elements forming the main structure of the framework section include a base member, the connector formations may include a set of connector pins secured to the base member. The connector pins may project downwardly from the framework section in the operative upright configuration thereof, permitting the pins to plug into complementary sockets provided beneath the framework section in its operative upright configuration.

As such, the framework section may include at least one locating formation for locating the required position of the framework section with respect to a floor region, to ensure proper connection between the connector formations and complementary formations provided in the said floor region. The position of the or each locating formation may be such that it renders the framework section uni-directional, thus ensuring that a framework section will always be correctly "plugged in". Once again, for the configuration of the framework section in which the framework elements forming the main structure include a base member, the locating formations may include at least one aperture in the base member that can co-operate with a locating pin provided in a floor region where the framework section is to be located.

Still further according to the invention, the framework section may include retaining means for retaining the framework section in its position in which its connector formations are electrically connected to complementary formations provided in a floor region where the framework section is located, in use. The retaining means may include at least one retaining clip that is releasably engageable with the framework section and requires removal to permit removal of a section and resulting disconnection between the connector formations of the section and complementary formations to which they are connected, in use.

The invention extends also to a demountable wall panelling system, which includes a plurality of framework sections that can be positioned adjacent one another to form a wall panelling structure, at least one framework section including a plurality of framework elements forming the main structure of the framework section, at least one set of power supply points mounted on the framework structure and a set of connector formations electrically connected to the power supply points, the connector formations being positioned on the framework section in a location in which, upon location of the framework section, in its operative configuration, the connector formations are electrically connected with complementary formations provided within the floor region where the framework section is located.

The said at least one framework section may be a framework section in accordance with the present invention.

Still further, the invention extends to an access flooring system which includes a floor panel support structure and a plurality of floor panels supported by the structure, the flooring system further including at least one base panel locatable to form a part of the floor structure along the line where panelling is to be located, the base panel having complementary formations connectable to power supplies and adapted to be electrically connected to connector formations of a framework section in accordance with the present invention.

Still further, the invention extends to the combination of a demountable wall panelling system and an access flooring system, in which the floor panelling system includes at least one framework section including a plurality of framework elements forming the main structure of the framework section, at least one set of power supply points mounted on the main structure and a set of connector formations electrically connected to the power supply points, the connector formations being positioned on the framework section in a location in which, upon location of the framework section into its operative configuration, the connector formations are electrically connected to complementary formations provided within the floor region where the framework section is to be located and the access flooring system includes a base panel that can form a part of the floor structure and that has complementary formations that can be electrically connected to the connector formations of the said framework section with the framework section in its operative configuration positioned upon the floor structure. Clearly, the said combination may include a framework section in accordance with the present invention.

Figure 2:
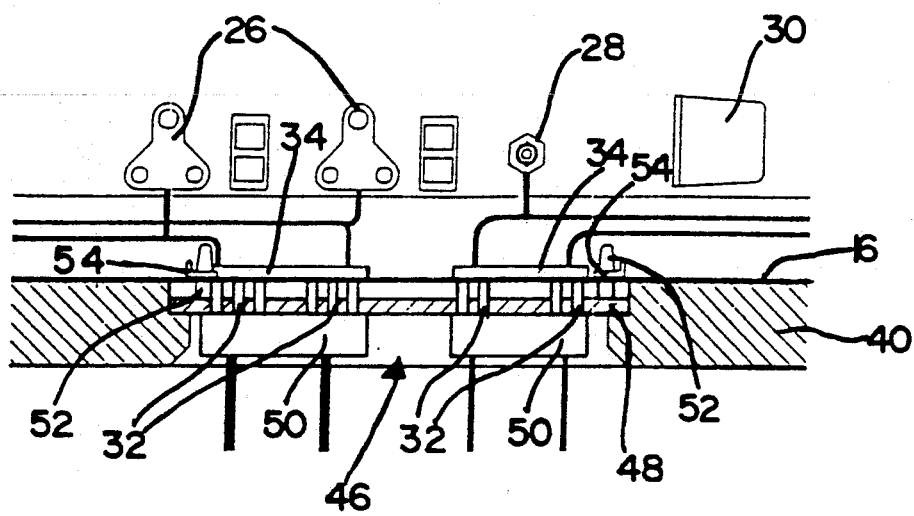

The invention is now described, by way of an example, with reference to the accompanying diagrammatic drawings, in which:

FIG. 1 shows an elevational front view of a framework section for a demountable panelling system, in accordance with the invention; and FIG. 2 shows an enlarged view of a part of the framework section of FIG. 1.

Referring to the drawings, a framework section for a demountable wall panelling system, in accordance with the invention, is indicated generally by the reference numeral 10. The framework section 10 includes two uprights 12 held in a spaced configuration by a top member 14 and a base member 16. Two support rails 18 are also shown, whereby cladding panels can be releasably engaged with the framework section 10.

When used for a demountable wall panelling system, a plurality of framework sections 10 are positioned adjacent one another along a line where panelling is required, whereafter cladding panels can be releasably engaged with the framework sections to thereby complete the panelling. As this does not form an essential part of the present invention and as the specific construction of framework sections of the above type is greatly variable, this is not described in any further detail herein.

The framework section 10 further includes two sets of power supply points, 20 and 22 respectively, each set of power supply points being mounted on a support panel 24 which in turn is mounted on the uprights 12, thus providing for the power supply points to be mounted on the framework section 10. The set of power supply points 22 is located in the skirting region of the framework section 10, whereas the set of power supply points 20 is located at a location where it will be disposed immediately above the top of desking that can be used in association with the panelling.

Each set of power supply points typically includes two electrical power points 26, a data point 28 and a telephone point 30, although these and other points can be provided in different numbers and combinations, as may be determined by particular requirements. Clearly, these points are accompanied by suitable switches and other electrical components that are commonly associated with these points.

As is clear from FIG. 1 of the drawings, the respective electrical power points, data points and telephone points of the two sets of points are electrically connected to one another.

Still further, the bottom set of points 22 are connected to a series of connector pins 32 projecting from support elements 34 that are secured to the base member 16 of the framework section 10. This construction is shown clearly in FIG. 2 of the drawings. The pins 32 are disposed to co-operate with complementary socket formations that are electrically connected to suitable power supplies, whereby power can thus be supplied to the two sets of power supply points, 20 and 22. The complete framework section 10 is thus in effect an electrical appliance that is merely plugged-in, in order to electrically connect the sets of power supply points thereof to power supplies.

The framework section 10 is designed to be used in conjunction with access flooring which provides for a service space through which electrical wiring can be guided to locations where panelling is to be installed. A system of access flooring can thus also be particularly designed to co-operate with the panelling system of the invention and, in particular, the use of framework sections 10 as hereinabove described.

Referring again to the drawings, a typical floor panel forming part of an access flooring system is indicated by the reference numeral 40, the panel 40 being supported on support beams 42 whereby the service space 44 referred to above is created. It is anticipated that the panel 40 can be provided with an aperture 46 therein within which a base panel 48 is locatable, the base panel 48 supporting sets of socket formations 50 into which the connector pins 32 can plug. Clearly, the socket formations 50 are designed for the purpose, thus facilitating the simple "plugging-in" of framework sections in the manner hereinabove described. In order to ensure the proper location of framework sections 10 with respect to floor panels 40, locating pins 52 project from the base panel 48, whereas the base member 16 of the framework section 10 has apertures therein through which these locating pins can pass for the correct location of the framework sections. The configuration of the locating pins 52 and the socket formations 50 is such that a framework section cannot be reversed and thereby incorrectly plugged in. Retaining clips 54 are further provided to engage the locating pins 52 so that a framework section cannot be removed without the removal of the retaining clips 54, thus ensuring that a framework section remains properly "plugged-in".

It will be appreciated that the combination of the demountable framework system and access flooring system as above described will considerably facilitate electrical and communication wiring in conjunction with panelling, thus adding to the overall versatility of demountable panelling systems. The framework system can also be used with conventional floor power ducting.

It must be understood that a particular framework section need not include both sets of power supply points, it being anticipated that either set of power points 20 or 22 can be omitted from a particular framework section if not required.

The base panel 48 and the associated socket formations 50 and locating pins 52 can be provided together with framework sections 10, so that these panels can form a part of a demountable panelling system as such. The socket formations 50 clearly provide for simple connection to supply wiring and once wiring has been effected, it will be appreciated that the supply of power to power supply points will be greatly simplified.

I claim:

1. A framework section for a demountable wall panelling system, which includes a plurality of framework elements including a base member forming the main structure of the framework section, at least one set of power supply points mounted on the said main structure and a set of connector formations electrically connected to the power supply points, the connector formations being positioned on the base member in a location in which, upon location of the framework section into its operative configuration, the connector formations are electrically connected to the complementary formations provided within the floor region where the framework section is located.

2. A framework section as claimed in claim 1, in which the framework elements forming the main structure of the framework section include two uprights, a top member and the base member, forming a rectangular structure with the top member and the base member holding the uprights in their required parallel spaced configuration.

3. A framework section as claimed in claim 2, in which the uprights have at least one support rail secured between them, the support rail having formations for the releasable engagement of cladding panels on the framework section.

4. A framework section as claimed in claim 1, in which the set of power supply points is mounted on a support panel that is mounted on the main structure in a predetermined required location.

5. A framework section as claimed in claim 4, in which the support panel is mounted in the operative bottom skirting region of the framework section.

6. A framework section as claimed in claim 4, in which the support panel is mounted on the main structure in an intermediate region between the operative top and bottom ends thereof.

7. A framework section as claimed in claim 1, in which the set of power supply points includes a set of socket formations together with associated switches and other electrical components which will facilitate the use of the supply points for predetermined power supply applications.

8. A framework section as claimed in claim 7, in which the power supply points can provide for power supply to electrical and electronic equipment, telephone and other communication equipment, and/or the like, in the operative configuration of the framework section.

9. A framework section as claimed in claim 1, which includes two sets of equivalent power supply points that are inter-connected and that are connected to the same connector formations, the sets of power supply points being mounted at different locations on the main structure.

10. A framework section as claimed in claim 1, in which the connector formations include a set of connector pins secured to the base member.

11. A framework section as claimed in claim 10, in which the connector pins project downwardly from the framework section in the operative upright configuration thereof, permitting the pins to plug into complementary sockets provided beneath the framework section in its operative upright configuration.

12. A framework section as claimed in claim 1, which includes at least one locating formation for locating the required position of the framework section with respect to a floor region to ensure proper connection between the connector formations and complementary formations provided in the said floor region.

13. A framework section as claimed in claim 12, in which the locating formation includes at least one aperture in the base member that can co-operate with a locating pin provided in a floor region where the framework section is to be located.

14. A framework section as claimed in claim 1, which includes retaining means for retaining the framework section in its position in which its connector formations are electrically connected to complementary formations provided in a floor region where the framework section is located, in use.

15. A framework section as claimed in claim 14, in which the retaining means includes at least one retaining clip that is releasably engageable with the framework section and requires removal to permit removal of a section and resulting disconnection between the connector formations of the section and complementary formations to which they are connected, in use.

16. A demountable wall panelling system, which includes a plurality of framework sections including a base member that can be positioned adjacent to another to form a wall panelling structure, at least one framework section including a plurality of framework elements forming the main structure of the framework section, at least one set of power supply points mounted on the main structure and a set of connector formations electrically connected to the power supply points, the connector formations being positioned on the base member in a location in which, upon location of the framework section, in its operative configuration, the connector formations are electrically connected with complementary formations provided within the floor region where the framework section is located.

* * * * *